United States Patent [19]
Satori et al.

[11] Patent Number: 5,657,510
[45] Date of Patent: Aug. 19, 1997

[54] FLUID-FILLED INSULATING BUSHING

[75] Inventors: Kazutoshi Satori; Yuichi Ogawa, both of Saitama, Japan

[73] Assignee: Yamashita Rubber Kabushiki Kaisha, Saitama, Japan

[21] Appl. No.: 490,545

[22] Filed: Jun. 14, 1995

[51] Int. Cl.$^6$ ............................................. F16L 5/00
[52] U.S. Cl. ................................ 16/2.2; 267/140.11
[58] Field of Search ................ 16/2; 174/76, 77 R, 174/85, 91, 92; 267/140, 140.11

[56] References Cited

U.S. PATENT DOCUMENTS

| | | | |
|---|---|---|---|
| 3,801,209 | 4/1974 | Matsuoka | 16/2 |
| 4,193,162 | 3/1980 | Larssen | 16/2 |
| 4,434,320 | 2/1984 | Klein et al. | 174/77 R |
| 4,630,806 | 12/1986 | Dan et al. | 16/2 |
| 4,790,520 | 12/1988 | Tanake et al. | 267/140.1 |
| 5,024,461 | 6/1991 | Miyakawa et al. | |
| 5,064,176 | 11/1991 | Goto | |

FOREIGN PATENT DOCUMENTS 0009120  8/1979  European Pat. Off.

*Primary Examiner*—Chuck Y. Mah
*Attorney, Agent, or Firm*—Birch, Stewart, Kolasch & Birch, LLP

[57] ABSTRACT

A fluid-chamber space 21 of an elastic block 20 interposed between an outer cylinder 10 and an inner cylinder 30 is partitioned into two chambers by means of an elastic wall 40, whose inner edges 44 are engaged to an engaging groove of an elastic wall mount 24, and outer edges 46 are clamped between end portions of two fluid-chamber covers 50 covering an open portion of the fluid-chamber space 21. When pressed into the outer cylinder 10 in this state, even when the elastic wall 40 deforms elastically by fluid pressure, since a contact portion with the elastic block 20 around the elastic wall 40 is moveable, the internal pressure rise is suppressed and the concentration of stress is relieved, thus low-action spring and high attenuation characteristics are obtained and durability is improved.

18 Claims, 13 Drawing Sheets

FLUID-FILLED INSULATING BUSHING

BACKGROUND OF THE INVENTION

1. Field of the Invention

The present invention relates to a fluid-filled insulating bushing used in a suspension arm and the like of an automobile.

2. Description of Background Art

Such a fluid-filled insulating bushing is well known, for example, as disclosed in West German Patent No. 2841505. I this bushing an inner cylinder, an outer cylinder and an elastic block are provided between the cylinders. Fluid chambers are divided into plural numbers in a circumferential direction by elastic walls and communicate with each other through an orifice passage being formed in an elastic block. In the present invention, the circumferential direction is defined as a concentric direction of the circumferential direction of the inner and outer cylinders, an axial direction is defined as a direction parallel to the axial direction of the inner and outer cylinders and a radial direction is defined as a direction which coincides with the radial direction of the inner cylinder.

Now, the elastic wall is formed thinner to a certain extent so that it is susceptible to elastic deformation, and acts to absolve the pressure rise following a volumetric change of the fluid chambers, thereby vibration of a small amplitude is coped with a mild spring characteristic or a low-action spring, and a high attenuation is exhibited against vibration of a large amplitude. However, since a large fluid pressure is repetitively exerted on the elastic wall, the base portion of the elastic wall is liable to fatigue, so that a spring constant at this portion can not be reduced unlimitedly and low-action spring characteristics are naturally restricted definitely. Thus, it is strongly desired to improve the low-action spring and high attenuation characteristics and to improve durability by relieving the concentration of stress against the elastic wall. The present invention is directed to satisfying such requirements.

SUMMARY OF THE INVENTION

In order to solve the above-mentioned problems, a fluid-filled insulation bushing of the present invention comprises, an inner cylinder, an outer cylinder and an elastic block interposed between the inner and outer cylinders, an inner space of a fluid chamber provided in the elastic block is partitioned by an elastic wall to form, at least, two fluid chambers communicating with each other through an orifice passage, and the elastic wall is formed separately with and disengageable to the elastic block.

By such configuration, connections between the elastic wall and elastic block are discontinued from the material point of view, and the stress concentration at this portion is relieved, results in an improvement of durability.

The elastic wall includes a wall body portion extending in the radial and axial direction between the inner and outer cylinders. Outer edges of the wall body portion contact closely to an inner surface of the outer cylinder, and the outer portion including inner edges of the inner cylinder contacts closely to the elastic block, thereby sealing sealed-in fluid.

By such a configuration, the sealed-in fluid between the fluid chambers clamping the elastic wall can be sealed by such intimate contact portions.

Furthermore, the inner edges can be engaged to an elastic wall mount formed in a unit with the elastic block.

By such a configuration, the elastic wall can be installed simply.

In addition, the fluid chambers of the elastic block include respective outer cylinder sides that are open and the open portions can be covered by partly circular fluid-chamber covers, which are provided in plural numbers corresponding to the fluid chambers along the inner surface of the outer cylinder.

By such configuration, the fluid chambers can be covered easily and the entire assembly can be further simplified.

Also, the outer edges of the elastic wall can be clamped between the end portions of the two-fluid chamber covers adjacent to each other in the circumferential direction.

By such configuration, the outer edges of the elastic wall can be positioned reliably.

Furthermore, positioning means can be provided at an contact portion of the outer edges of the elastic wall and the fluid-chamber cover.

By such configuration, positioning can be accomplished simply and reliably by the positioning means.

Also, an orifice passage can be formed by, a groove for an orifice formed on the outer edge surface of the elastic wall, a communicating portion formed at edge portions of the fluid-chamber covers clamping the elastic walls in such a manner to communicate the groove with the fluid chamber, and the inner surface of the outer cylinder.

By such configuration, the orifice passage can be formed easily and changes in a sectional area of the passage can be restrained.

Meanwhile, a seal lip can be provided, at least, at a portion around the elastic wall contacting to the elastic block.

By such configuration, it is possible to seal more reliably.

On the other hand, ring portions engaging into the outer cylinder can be provided at axial opposite ends along the inner cylinder of the elastic block, and rigid ring frames can be embedded in a unit in circumferential outer edges of the ring portions.

Also, the ring frame can be provided at the peripheral surface of the ring portions, and an annular seal ring can be provided in a unit with the elastic block at the axial opposite sides of the ring frame.

By such configuration, a sealing performance between the elastic block and the outer cylinder at the axial opposite ends can be made more reliable.

The present invention is capable of forming a clearance between the elastic wall mount and the wall body portion of the elastic wall.

By such configuration, since the elastic wall can be moved more freely against the elastic block, the concentration of stress can be further relieved.

Furthermore, when, at lest, a pair of lips are provided in the clearance to clamp the wall body portion of the elastic wall therebetween, a thickness of the wall body portion of the elastic wall can be reduced and the clearance can be further enlarged.

Another means for solving the above-mentioned problems, a fluid-filled insulating bushing of the present invention comprises, an inner cylinder, an outer cylinder and an elastic block interposed between the inner and outer cylinders, a pair of ring portions formed at axial opposite sides of the inner cylinder and pressed into the outer cylinder, and a fluid chamber space formed between the ring portions being provided in the elastic block, an inner space of the fluid chamber being partitioned by an elastic wall formed in a unit with the elastic block to form, at least, two fluid chambers communicating with each other through an orifice passage, wherein the elastic wall includes a wall body portion extending in a radial and axial direction between the inner and outer cylinders, and outer edges located on the outer cylinder side is made movable by a periphery of the wall body portion.

When the outer edges of the wall body portion is made movable as such, since the internal pressure rise and the concentration of stress at the connection of the elastic wall and the elastic block are relieved by the movement of the outer edges, durability is improved and low-action spring and high attenuation characteristics can be further improved.

At this time, the outer edges are engage and contacted closely to the inner surface of the outer cylinder, and in the state before engagement to the outer cylinder, the outer edges can protrude outwardly in a radial direction from the inner surface of the outer cylinder.

By such configuration, when the outer edges are engaged to the outer cylinder, the outer surface of the outer edges is in intimate contact with and pressed tightly against the inner surface of the outer cylinder for sealing, thus unnecessary movement of the outer edges can be prevented.

In the fluid chambers of the elastic block, respective outer cylinders sides thereof are open, and open portions are covered by partly circular fluid-chamber covers provided in plural numbers corresponding to the fluid chambers along the inner surface of the outer cylinder, the outer edges of the elastic wall being clamped between circumferential edges of a pair of fluid-chamber covers.

By such configuration, the fluid chamber filled with fluid can be sealed simply, and the elastics can be inserted into the outer cylinder for assembly with the fluid-chamber cover being installed thereon. Besides, when the outer edges of the elastic wall is clamped between the circumferential edges of the pair of fluid-chamber covers, the outer edges of the elastic wall can be positioned reliably, and a structure preventing the unnecessary large movement can be obtained simply.

At this time, a clearance for allowing elastic deformation of the outer edges can be formed between the outer edges of the elastic wall and the circumferential edges of the fluid-chamber cover, and furthermore, the circumferential edges can be formed diagonally to an edge portion extending in an axial direction of the outer edges, and an axial widthwise center portion can be spaced extremely from the outer edges.

By such configuration, the movement of the outer edges is allowed within the clearance and a spring constant can be reduced at the movable time point, and since the spring constant becomes higher when restricted, the spring constant of the elastic wall can be changed non-linearly and a high attenuation is exhibited against vibration of a wide range.

Besides, the clearance with the outer edges can be formed simply and the movement of the outer edges can be controlled accurately. Furthermore, when the circumferential edges is formed diagonally to the edge portion extending in the axial direction of the outer edges, and the axial widthwise center portion is spaced extremely from the outer edges, deformation of the outer edges at the time of movement can be made naturally.

Still further, a communication passage of fluid communicating the fluid chambers clamping the elastic wall can be formed by, an orifice groove formed on the outer surface of the Outer edges, a notch formed at circumferential edges of the fluid-chamber cover and the inner surface of the outer cylinder, besides, the notch can be provided at an extremely spaced portion from the outer edges at the circumferential edges of the fluid-chamber over.

By such configuration, the communication passage can be formed simply and reliably. Besides, when the notch is formed at the extremely spaced portion from the outer edges at the circumferential edges of the fluid-chamber cover, it is not clogged even when the outer edges contact the circumferential edges, thus the communication passage is secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
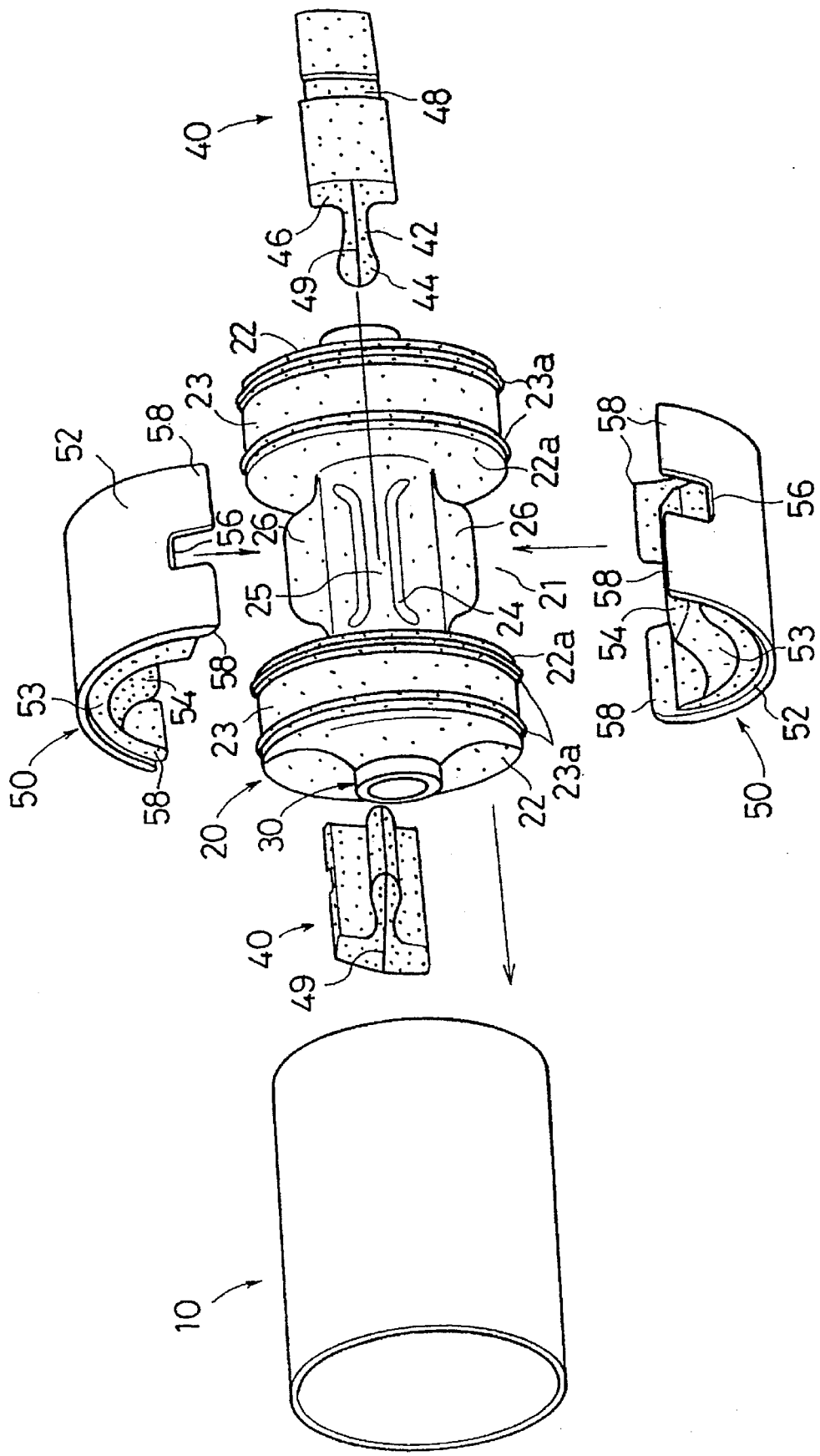
FIG. 1 is an exploded perspective view showing a first embodiment.
Figure 2:
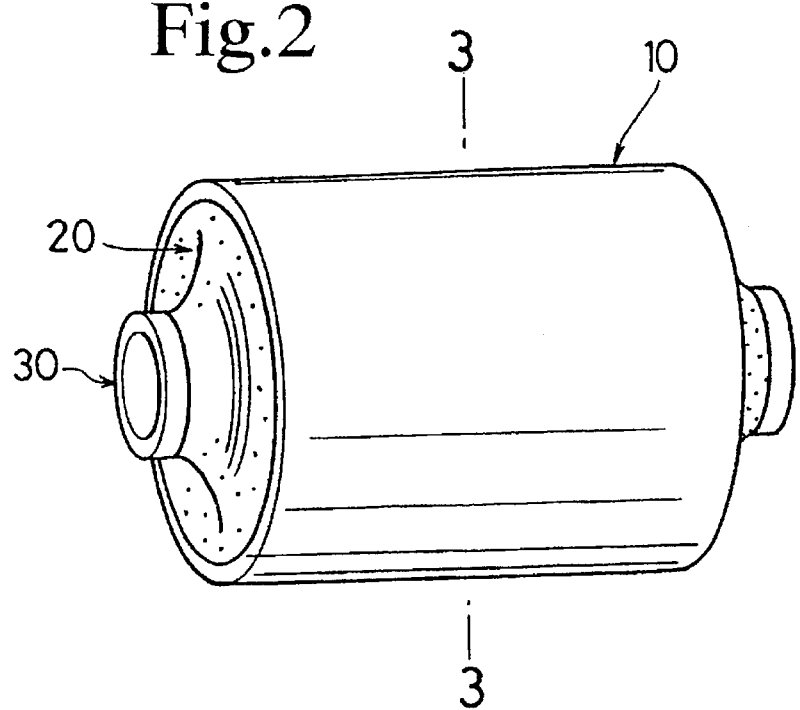
FIG. 2 is a perspective view showing the first embodiment.
Figure 3:
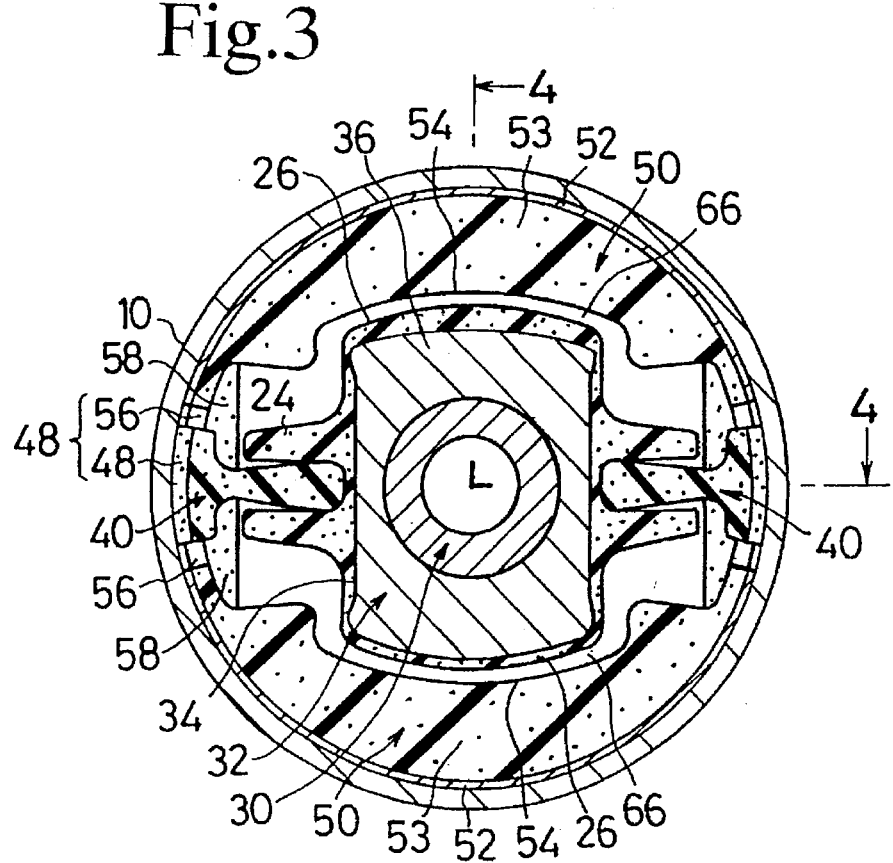
FIG. 3 is an enlarge sectional view taken along a line 3—3 of FIG. 2.
Figure 4:
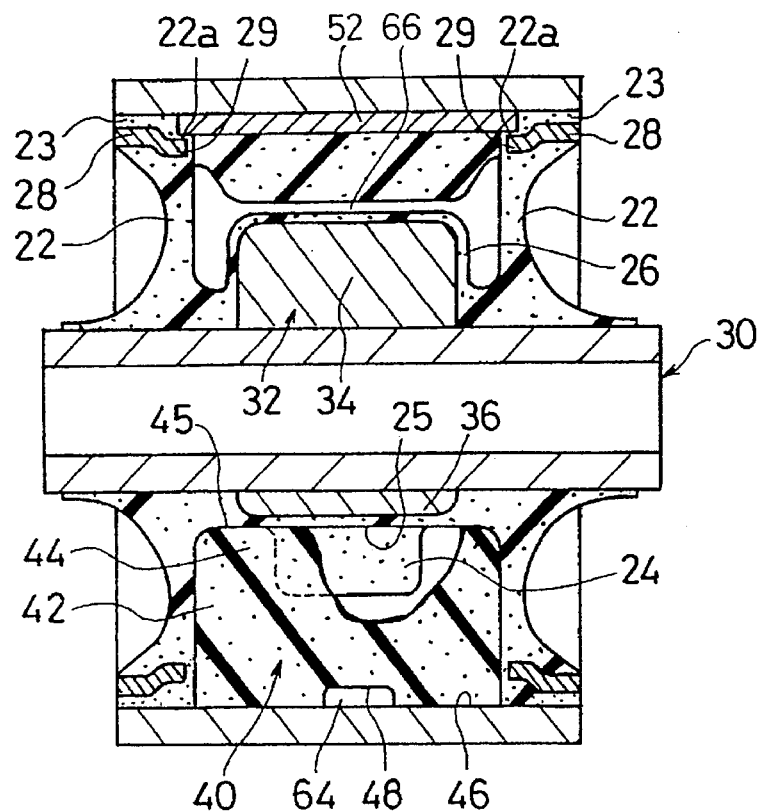
FIG. 4 is an enlarged sectional view taken along a line 4—4 of FIG. 3.

Referring to a first embodiment based on FIG. 1 through FIG. 11, FIG. 1 is a perspective view showing exploded component parts of a fluid-filled insulating bushing, FIG. 2 is a perspective view showing an appearance of a finished product, FIG. 3 is a sectional view taken along a line 3—3 of FIG. 2 and FIG. 4 is a sectional view taken along a line 4—4 of FIG. 3.

First, as shown in FIG. 1, the fluid-filled insulating bushing of the present embodiment comprises, an outer cylinder 10 consisting of a metal cylindrical member, an elastic block 20 in which fluid-chamber space 21 is formed, an inner cylinder 30 consisting of a metal member and disposed concentrically or eccentrically (concentrically in this embodiment) inside the outer cylinder 10, an elastic wall 40 partitioning the fluid-chamber space 21 and a fluid-chamber cover 50 covering an open portion of the fluid-chamber space 21.

The fluid-filled insulating bushing is constituted by assembling the elastic block 20, inner cylinder 30, elastic wall 40 and fluid-chamber cover 50 into semi-assembly, which is pressed into the outer cylinder 10 in a sealed-in fluid bath while introducing fluid into a fluid chamber through a communicating portion 56 of the fluid-chamber cover 50 to be described later, and caulking opposite end portions of the outer cylinder 10.

The elastic block 20 is consisting of an elastic material such as rubber or a suitable synthetic resin for absolving vibration, and is formed by embedding the inner cylinder 30 in a unit in the center. Ring portions 22 engaging into the outer cylinder 10 are provided at axial opposite ends along the inner cylinder 30, and an intermediate portion of the ring portions 22 is gouged to form a fluid-chamber space 21.

In the fluid-chamber space 21, an elastic wall mount 24 protruding bifurcately in a circumferential direction of the inner cylinder 30 at a spaced relationship of approximately 180 degree is formed, and a stopper protrusion 26 is formed at and spaced from the elastic wall mount 24 by approximately 90 degree.

Figure 7:
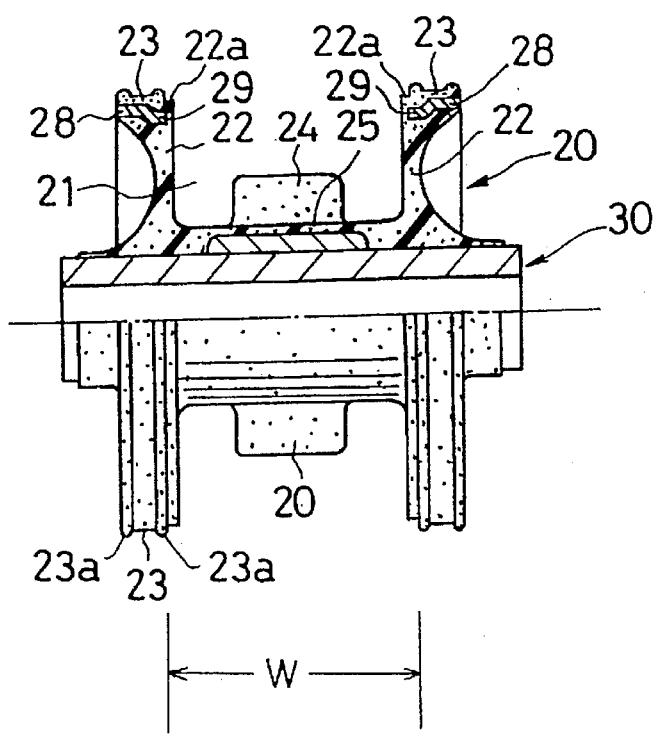
FIG. 7 is an axial sectional view showing an integrated portion of an inner cylinder and an elastic block of the first embodiment, FIGS. 8A and 8B, hereinafter collectively referred to as FIG. 8, are views showing an elastic wall in the first embodiment.

As it is apparent from FIG. 4 and FIG. 7 which is an axial semi-sectional view of the elastic block 20 which is in a unit with the inner cylinder 30, a thin seal layer 23 is formed on a peripheral surface of the ring portions 22 in a unit with the ring portions 22. Also, a seal ring 23a is formed annularly on the periphery of the seal layer 23. However, the layer may be omitted as to be described later.

In the vicinity of outer edges of the ring portions 22 inside the seal layer 23, a rigid metal ring frame 28 is embedded in a unit, and a reduced-diameter step 29 is formed on the inner circumferential side of the ring frame 28, a reduced-diameter step 22a of the ring portions 22 is formed thereon.

As illustrated in FIG. 3, the elastic wall mount 24 is formed in a unit with a thin elastic layer covering a long side portion 34 of a stopper metal 32 having an approximately elliptic section provided around the inner cylinder 30, and an engaging groove 25 for installing the elastic wall 40 is provided between a pair of opposing walls protruding into the fluid-chamber space 21.

The stopper protrusion 26 includes a protrusion 36 of the stopper metal 32 extending outward in the radial direction and an elastic layer covering its surface, the elastic layer is comparatively thin and its thickness is made asymmetrical as required, such as thick on one side (upper side in FIG. 3) and thin on another side (lower side in FIG. 3) as shown in the figure.

Figure 6:
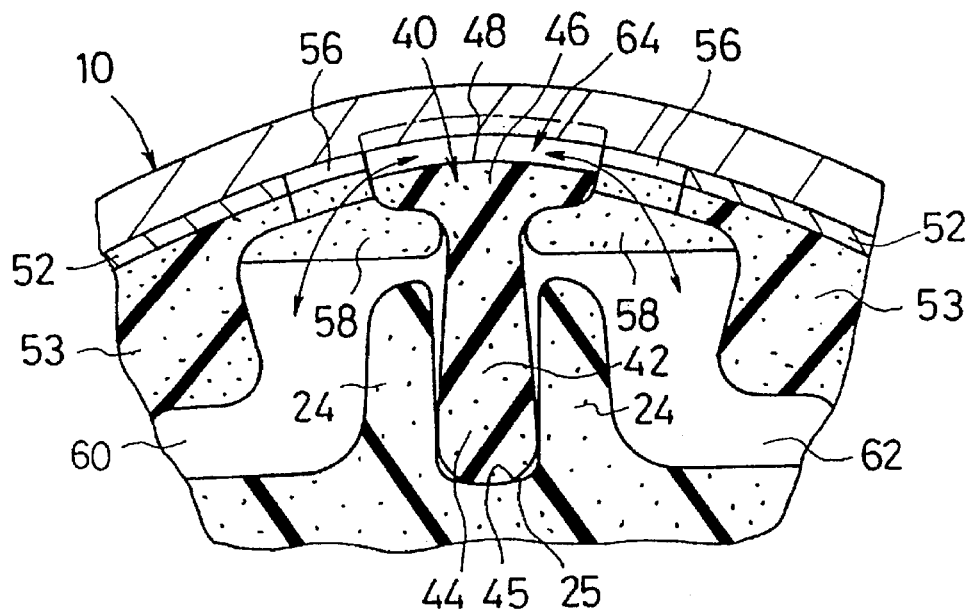
FIG. 6 is an enlarged sectional view showing an elastic wall of the first embodiment.

As it is apparent from FIG. 6, the elastic wall 40 is formed separately from the elastic block 20, and consists of the same material as the elastic block 20 or a suitable elastic material having different characteristics and an approximately T-shaped section, including low-action spring characteristics for absolving the fluid pressure variation by elastic deformation, and includes a wall body portion 42 extending in a radial and axial direction between the inner and outer cylinders, the spring constant can be set optionally.

An axial length of the elastic wall 40 is approximately equal to a distance W (refer to FIG. 7) between the two ring portions 22, and an inner edge 44 formed on the inner cylinder 30 side of the wall body portion 42 has a thickness of about a width of the engaging groove 25 of the elastic wall mount 24 tips 45 being formed into a curved surface so as to be disengageable with the elastic wall mount 24.

Outer edges 46 formed in a unit by continuous end portions on the opposite side of the inner edges 44 of the wall body portion 42 is formed into a partly circular shape so as to contact closely to the inner surface of the outer cylinder 10, and an orifice groove 48 traversing in a circumferential direction is formed at an outer surface center thereof (refer to FIG. 1).

A position of the outer edges 46 at the time of engaging the inner edges 44 of the elastic wall 40 to the elastic wall mount 24 is, as shown in a broken line in FIG. 6 showing the enlarged elastic wall 40 of FIG. 3, protruding outward from an inner surface of the outer cylinder 10, and at the time of pressing into the elastic block 20, compressed inward in the radial direction to separate the fluid-chamber space 21 into two fluid chambers 60 and 62.

Thus, when the elastic wall 40 is pressed into the outer cylinder 10 together with the elastic block 20, its inner edge 44 is in intimate contact with the portion along the inner cylinder 30 forming the fluid-chamber space 21 of the elastic block 20, axial opposite end portions are in intimate contact with wall faces of the ring portions 22 facing the fluid-chamber space 21 of the elastic block 20, and the outer edge 46 is in intimate contact with the inner surface of the outer cylinder 10, thereby a good sealing performance against the sealed-in fluid is secured.

Figure 8A:
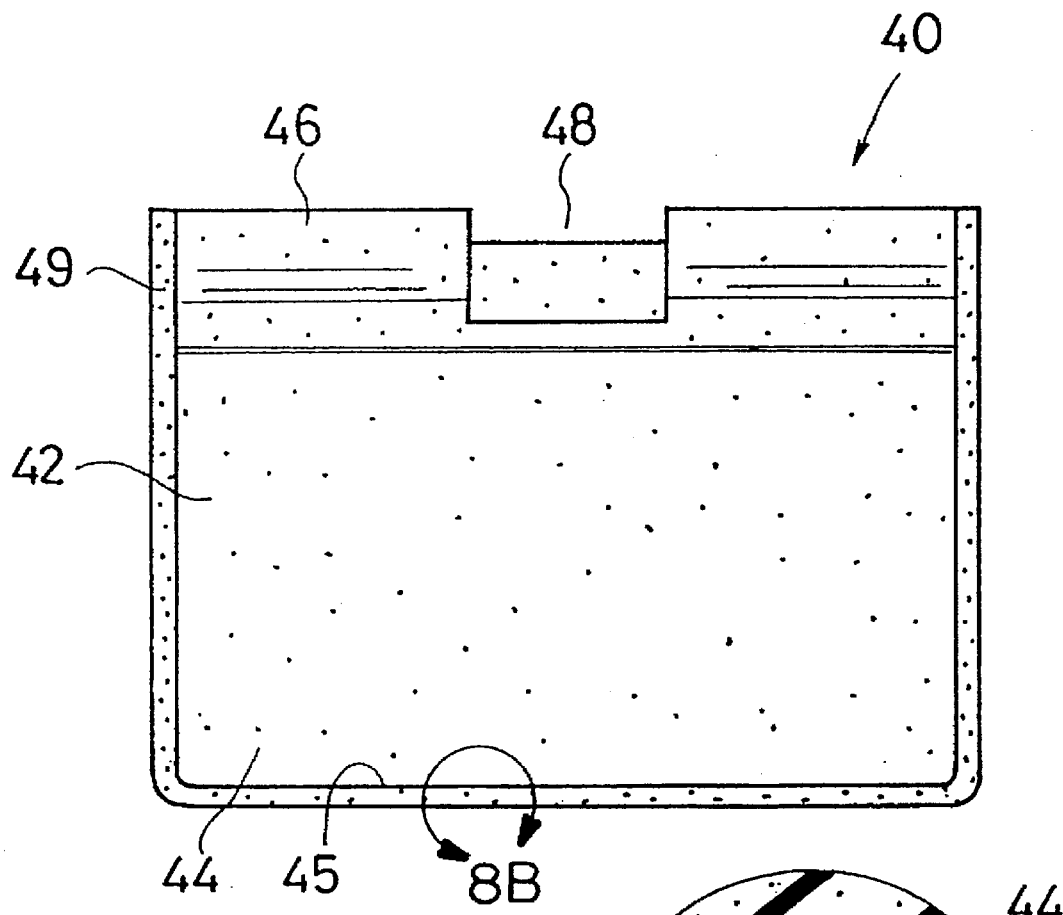
Figure 8B:
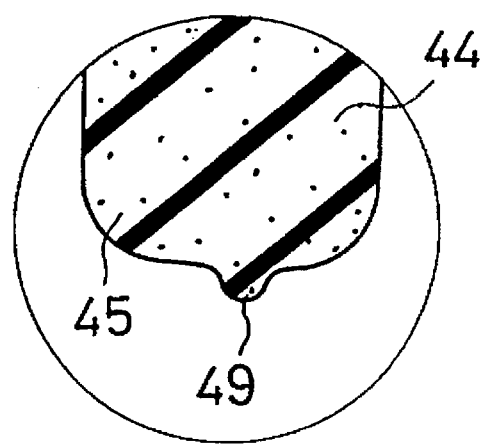

As it is apparent from FIG. 8 showing the elastic wall 40 from a circumferential direction of the fluid-filled insulating bushing, seal lips 49 protrude from three sides contacting closely to the wall faces of the ring portions 22 and the inner surface of the outer cylinder 10, except the outer edges 46 of the periphery thereof.

As it is apparent from FIG. 1, the fluid-chamber cover 50 includes two semi-cylindrical members having a circular curved face along the inner surface of the outer cylinder 10, and it is so designed that, when installed on the elastic block 20, the open portion of the fluid-chamber space 21 is covered, and by clamping the outer edges 46 of the elastic walls 40 between edges of a pair of fluid-chamber covers 50, the outer edges 46 is positioned.

An axial length of the fluid-chamber cover 50 is approximately equal to a distance W (refer to FIG. 7) between the two ring portions 22, and a circumferential length of the circular portion is approximately equal to one half of a portion obtained by subtracting a circumferential length of the outer edges 46 of the elastic walls 40 from the inner circumference of the outer cylinder 10.

An outer surface 52 of the fluid-chamber cover 50 along the inner surface of the outer cylinder 10 is made of metal, an elastic body 53 being laminated in a unit inside thereof, and a center portion of the elastic body 53 protrudes to form a stopper 54, which faces with the stopper protrusion 26 on the inner cylinder 30 side at a somewhat spaced relationship. An axial end portion of the outer surface 52 protrudes from the elastic body 53 so as to be superimposed on the reduced-diameter step 22a.

Figure 5:
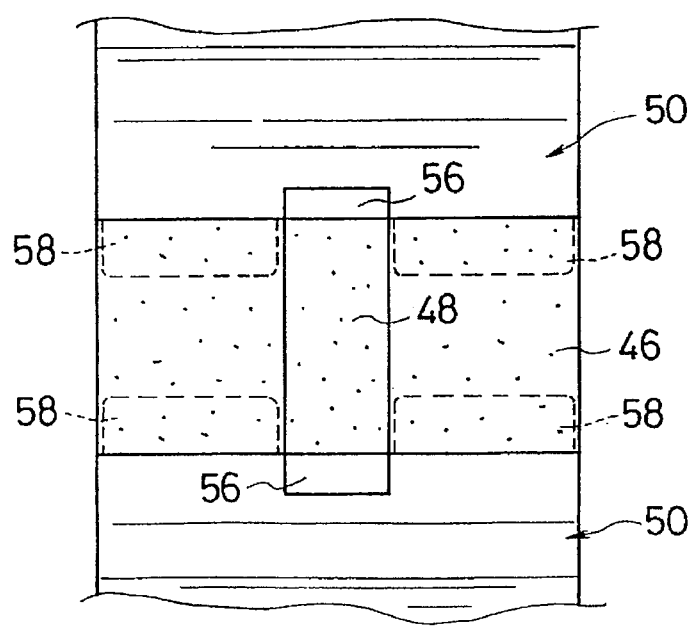
FIG. 5 is a plan view showing outer edges of the first embodiment.

FIG. 5 is an expanded view showing a state where the outer edges 46 of the elastic wall 40 is clamped between the end portions of the pair of fluid-chamber covers 50. As it is apparent from FIG. 5 and FIG. 6, a notched communication passage 56 formed at an extended position of the orifice groove 48 is formed at the circumferential edges of the fluid-chamber covers 50, or at the end portion in the circumferential direction of the bushing to constitute at orifice passage 64 with the orifice groove 48 and the inner surface of the outer cylinder 10.

The orifice passage 64 communicates the fluid chambers 60 and 62 partitioned by the elastic wall 40, and it is so designed that an attenuation force is produced by the movement of fluid between the two fluid chambers through the orifice passage 64, it is also possible to be set, optionally, to obtain a high attenuation force. Besides, by such a configuration, a passage sectional area of the orifice passage 64 can be stabilized.

As it is apparent from FIG. 4, respective inner portions of the fluid chambers 60 and 62 are separated on the axial opposite sides by the stopper protrusion 26 and the stopper 54, and the separated fluid chambers are communicated by a communication passage 66 formed at some distance between the stopper protrusion 26 and the stopper 54.

As shown in FIG. 5 and FIG. 6, the outer edge 46 is positioned by the circumferential edges of the fluid-chamber covers 50, by protruding salient positioning means 58 in the circumferential direction at opposite sides clamping the communication passage 56 and contacting to and supporting the rear side of the outer edges 46 of the elastic wall 40. The positioning means 58 are provided, at the circumferential edges, substantially throughout the entire width except the communication passage 56.

Next, the operation of the present embodiment is described. For example, at connections of a suspension arm, not shown, the outer cylinder 10 is engaged to a mounting hole on one side and the inner cylinder 30 is mounted to a mounting shaft on another side. At this working condition, vibration of a very small amplitude having a comparatively high frequency such as the vibration of engines is absolved by a good elastic deformation, and transmission of vibration is interrupted due to low-action spring characteristics of the elastic block 20.

At this time, even when the orifice passage 64 is apparently closed, since the elastic wall 40 can further deform elastically from this time point when an impact load is applied, vibration is continuously absolved and it is possible to prevent the orifice passage 64 from becoming rigid at the closing condition.

Meanwhile, when the impact load having a low frequency and comparatively large amplitude is applied, it is absolved by the attenuation force by the orifice passage 64. At this time, since a resonance frequency can be changed by elastic deformation of the elastic wall 40 responsive to input vibration, a high attenuation can be exhibited against the vibration of a wide range and cooperation of the low-action spring characteristic and high-attenuation characteristic is accomplished by presence of the elastic wall 40, thus a good impact load resistance characteristic is easily obtained.

In principle, vibration can be absolved till the elastic wall 40 is broken. A spring constant of the elastic wall 40 can be set optionally.

In such vibration absorption by the elastic deformation of the elastic wall 40, since a mounting leg 44 is engaged to the elastic wall mount 24 and tips 45 of the mounting leg 44 having a curved face is movable in the engaging groove 25 of the elastic wall mount 24, as compared with the case of integrating the elastic wall 40 with the elastic block 20, the concentration of stress at connections therebetween at the time of occurrence of internal pressure is considerably relieved.

Furthermore, since other end portions of the elastic wall 40 are respectively in intimate contact with the wall face of the ring portions 22 facing fluid and the inner surface of the outer cylinder 10 and are movable at the contacts, the concentration of stress at this portion can also be relieved the same as the mounting leg 44, as a result, a material fatigue at the connections between the elastic wall 40 and elastic block 20 is reduced, improving durability.

Besides, since the peripheral surface of the outer edges 46 of the elastic wall 40 is designed to protrude outward from the inside diameter of the outer cylinder 10 before engaging thereto, it is compressed at the time of engagement and its periphery is in intimate contact with the inner surface of the outer cylinder 10 and the elastic block 20 side, as a result, a high sealing performance can be secured. In addition, the sealing performance is further secured by the presence of the seal lip 49.

Also, since the elastic wall 40 is provided separately from the elastic block 20 and the fluid-chamber cover 50 is divided into two portions, a combination, in which only a portion of component parts is changed to those of different characteristics, can be obtained at any time, thus specifications can be changed easily.

Besides, by supporting the outer edges 46 of the elastic wall 40 by the fluid-chamber cover 50 divided into two portions, the outer edges 46 can be positioned. At this time, by supporting the outer edges 46 by the positioning protrusion 58, the outer edges 46 can be positioned more reliably. In addition, since the outer edge 46 is fixed rigidly by this positioning so as not to deform, even when the elastic wall 40 deforms elastically diversely, a stable performance can be exhibited.

Figure 9:
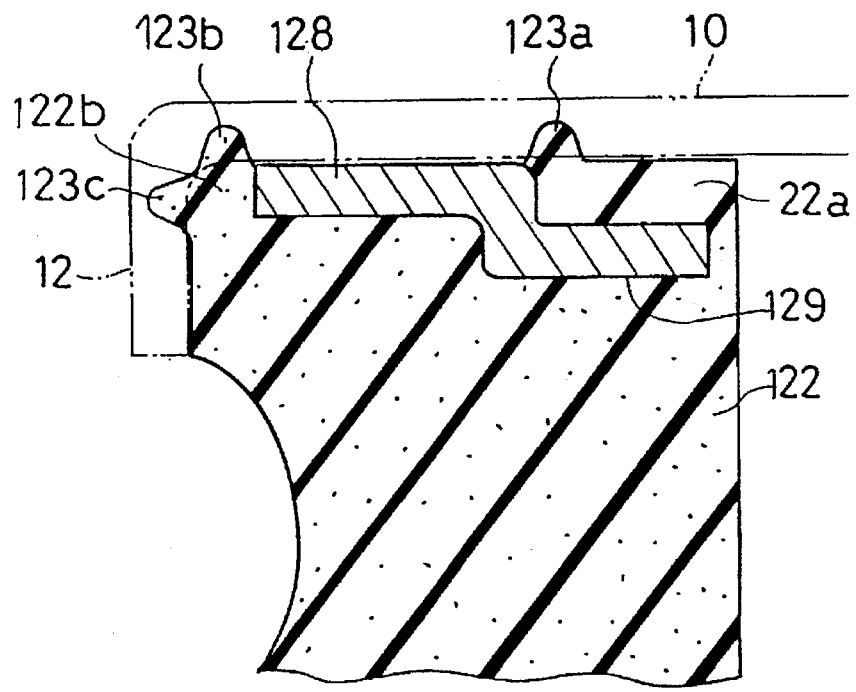
FIG. 9 is an enlarged sectional view of essential portions showing a modified example of a ring portion which is a second embodiment.

Next, a second embodiment is described based on FIG. 9. In the present embodiment the seal layer 28 is omitted, but since the other portions are substantially the same as the previous embodiment, like reference characters designate like or corresponding parts of the previous embodiment (it is also similar for the following embodiments). FIG. 9 shows a seal ring in a ring portion 122 without the seal layer 28, wherein an axial outer end portion of a ring frame 128 is drawn into the ring portion 122, and from a rubber peripheral surface 122b formed in a unit with the ring portion 122, a seal ring 123b is formed into an annular shape the same as the seal ring 123a. By such a configuration, both the outer side and the fluid-chamber side of the bushing can be sealed reliably against the peripheral surface of the ring frame 128.

Furthermore, as shown in a broken line, when caulking the axial edges 12 of the outer cylinder 10 to bend toward an axis, a seal ring 123c protrudes from the outer side face of the rubber peripheral surface 122b. At this time, the seal ring 123b may be used commonly or omitted.

Figure 10:
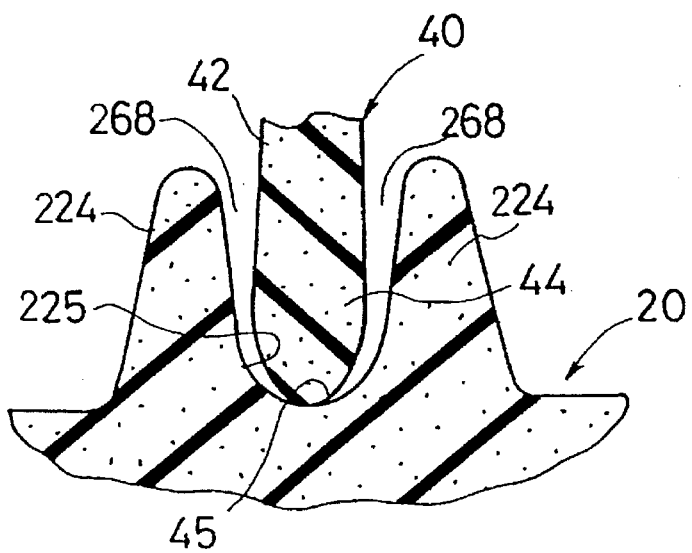
FIG. 10 is an enlarged sectional view of essential portions showing a modified example of an elastic wall mount which is a third embodiment.

FIG. 10 is a view showing a third embodiment which is a modified example of engagement between an elastic wall mount 224 and the elastic wall 40, wherein a width of an engaging groove 225 is made wider as compared with the thickness of the elastic wall 40, and a wide clearance 268 is formed between the elastic wall mount 224 and the elastic wall 40. Inner edges 44 of the elastic wall 40 contact to the engaging groove 225 only at a very narrow portion of its tips 45. By such a configuration, since the elastic wall 40 can be moved more freely against the elastic block 20, an internal pressure rise is suppressed and the concentration of stress is further relieved.

Figure 11:
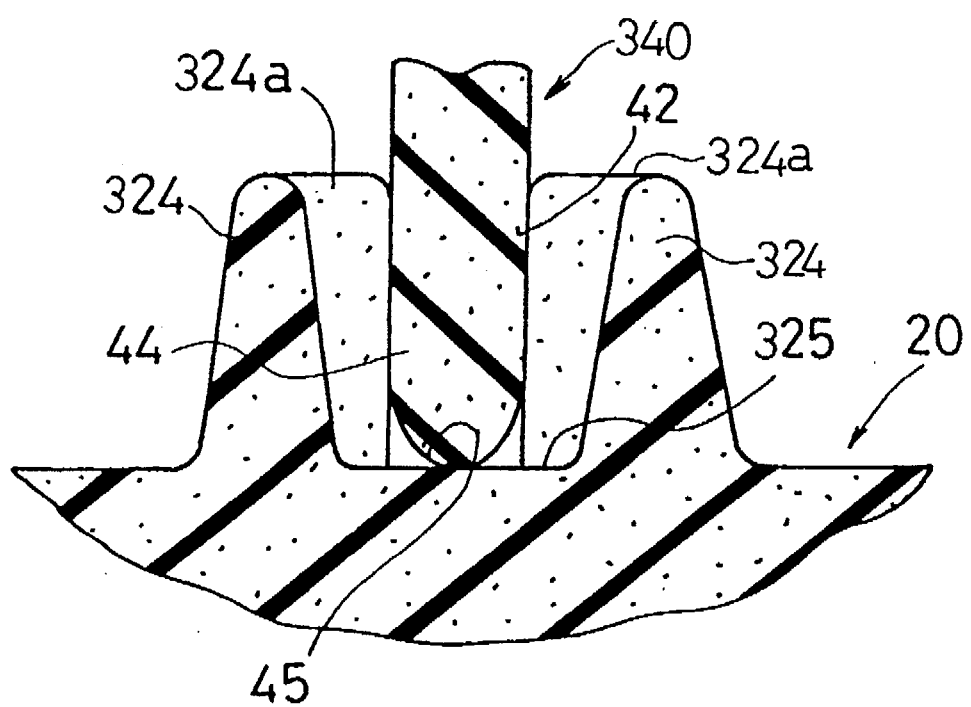
FIG. 11 is an enlarged sectional view of essential portions showing a separate modified example of an elastic wall mount which is a fourth embodiment.

FIG. 11 is a view showing a fourth embodiment which is another modified example of an engagement between an elastic wall mount 324 and an elastic wall 340, wherein a width of an engaging groove 325 is made wider and lips 324a protrude in a unit toward each other from a pair of opposing faces of the elastic wall mount 324 so as to clamp opposite sides of the comparatively thin elastic wall 340. By such a configuration, the clearance can be made wider and the elastic wall 340 can be positioned.

Figure 12:
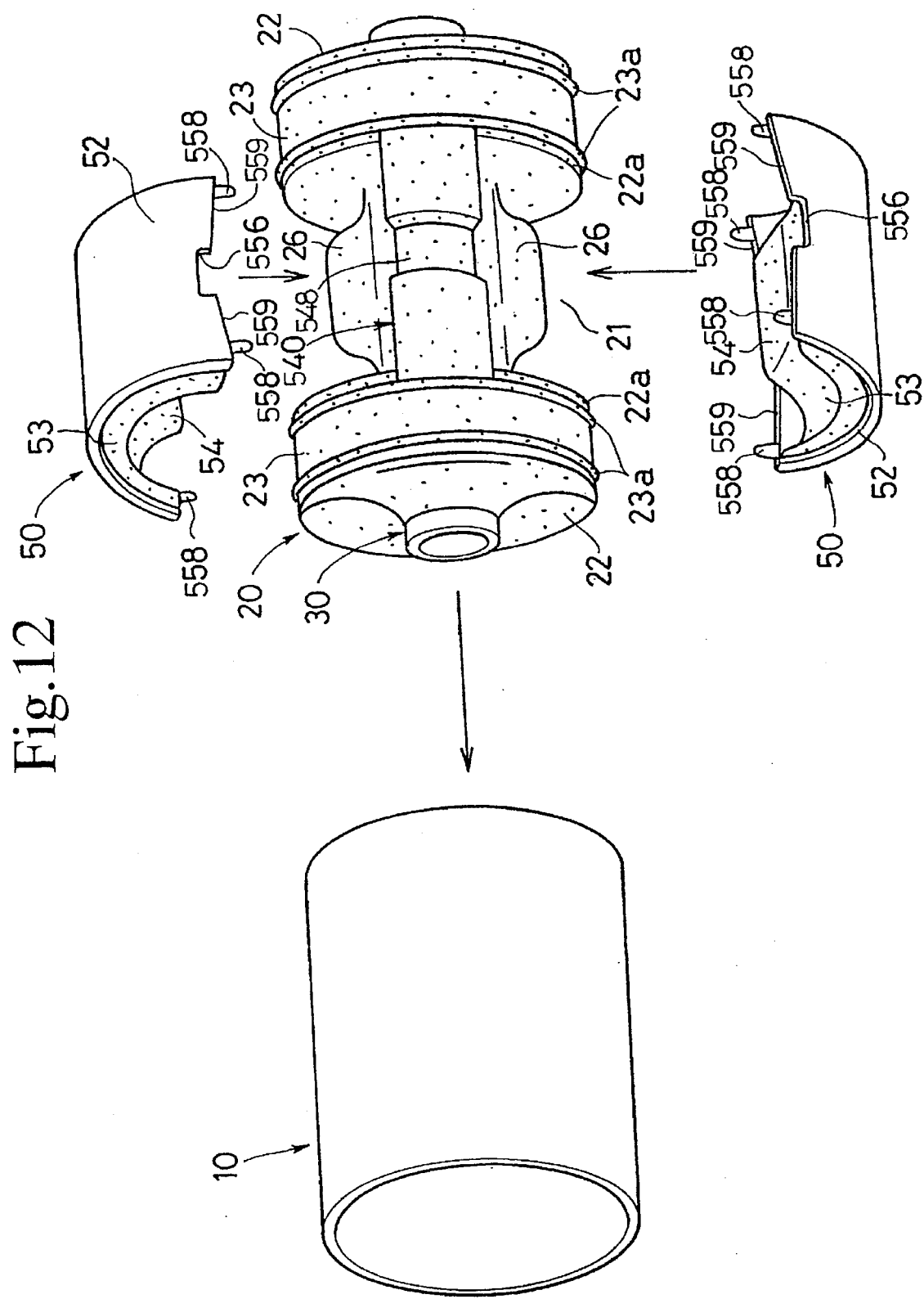
FIG. 12 is an exploded perspective view showing a fifth embodiment.
Figure 13:
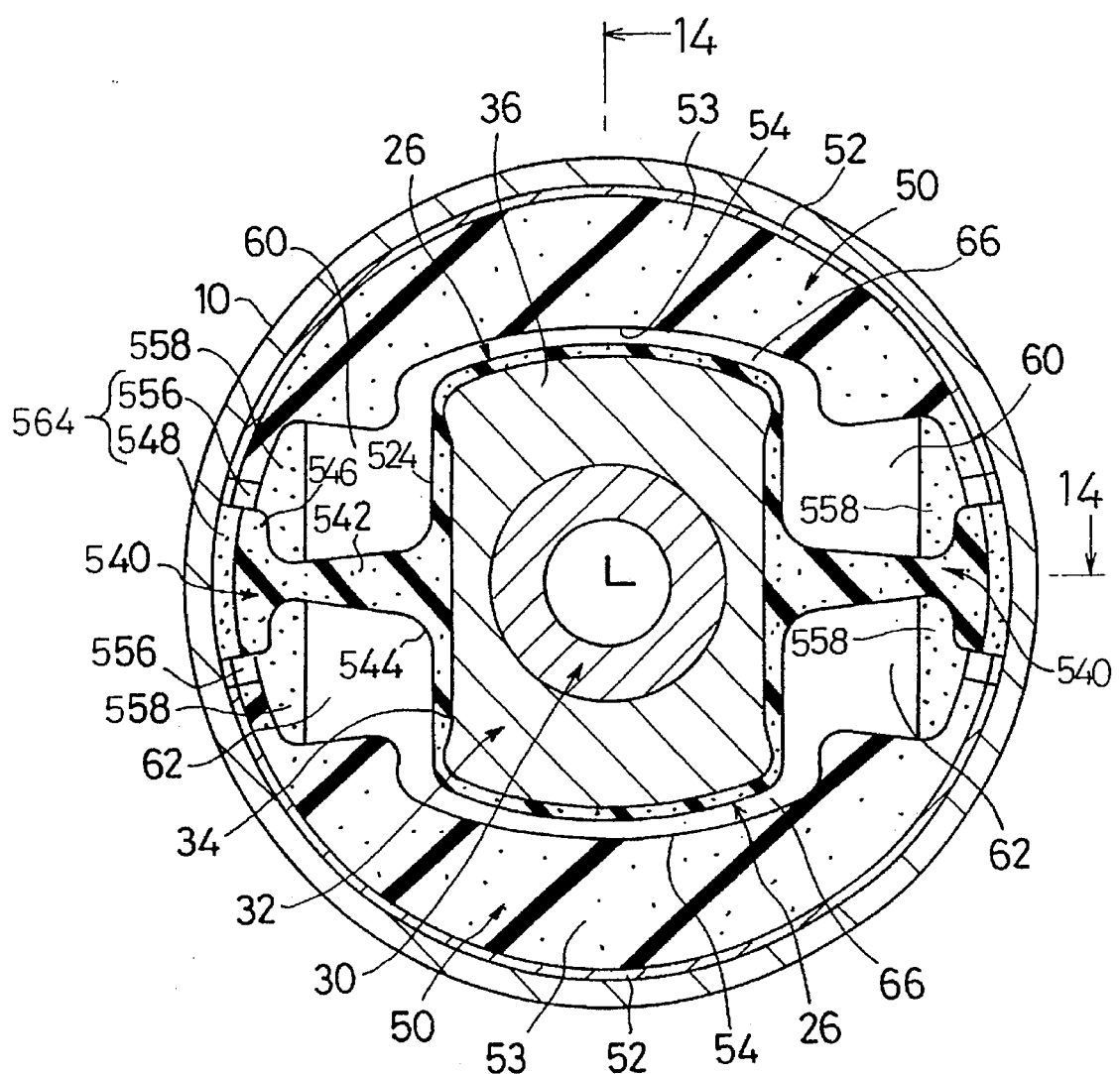
FIG. 13 is a view corresponding to FIG. 3 showing the fifth embodiment.
Figure 14:
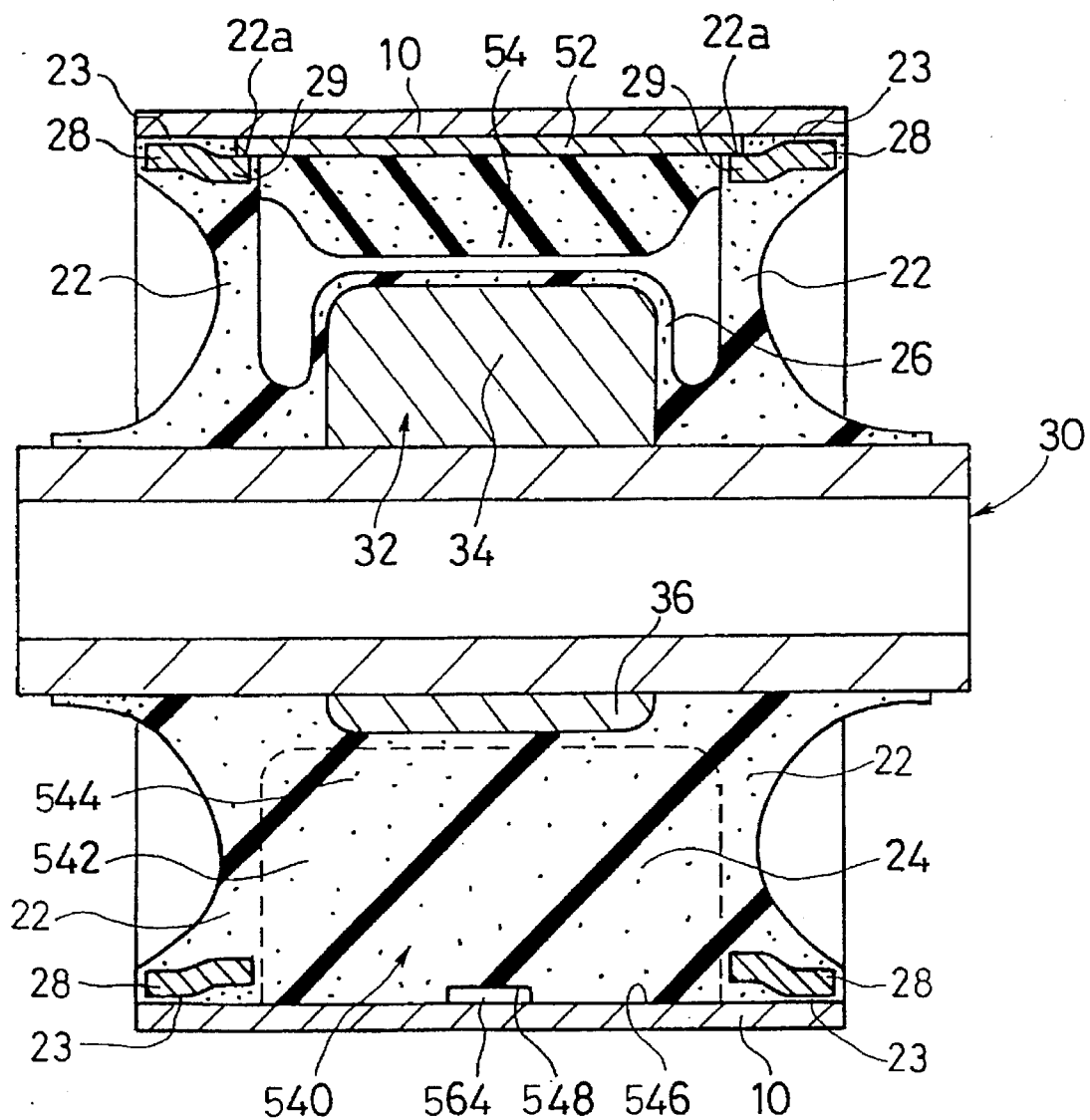
FIG. 14 is an enlarged sectional view taken along a line 14—14 of FIG. 13.

A fifth embodiment is described based on FIG. 12 through FIG. 17. FIG. 12 is a perspective view showing exploded component parts of a fluid-filled insulating bushing, FIG. 13 is a view corresponding to FIG. 3 in the fifth embodiment and FIG. 14 is a sectional view taken along line 4—4 of FIG. 13.

FIG. 13 is different from the previous embodiment in that, in the fluid-chamber space 21, a pair of elastic walls 540 protrude radially at a spaced relationship of approximately 180 degree in a circumferential direction of the inner cylinder 30 and are formed as a unit with the elastic block 20.

A thin elastic layer 524 covers around a stopper metal 32 having an approximately rectangular section and is provided around the inner cylinder 30, and the elastic walls 540 are formed as a unit at portions of the elastic layer 524 covering the long-side portions 34 of the stopper metal 32.

The elastic walls 540 is made of a member having an approximately T-shaped section, which deforms elastically responsive to the fluid pressure variations, include wall body portions 542 extending in a radial and axial direction between the inner and outer cylinders, and are as a unit with the elastic layer 524 at base portions 544.

As illustrated in FIG. 14, axial opposite end portions of the elastic walls 540 are formed as a unit and continuously to wall faces of the ring portions 22 facing the fluid-chamber space 21 of the elastic block 20, and an axial width W (refer to FIG. 16 and FIG. 17) is approximately equal to the distance between the two ring portions 22.

Outer edges 546 as an opposite end portion of the base portion 544 has a partly circular shape so as to contact closely to the inner surface of the outer cylinder 10, and an orifice groove 548 traversing in a circumferential direction is formed at its peripheral center portion.

Figure 15:
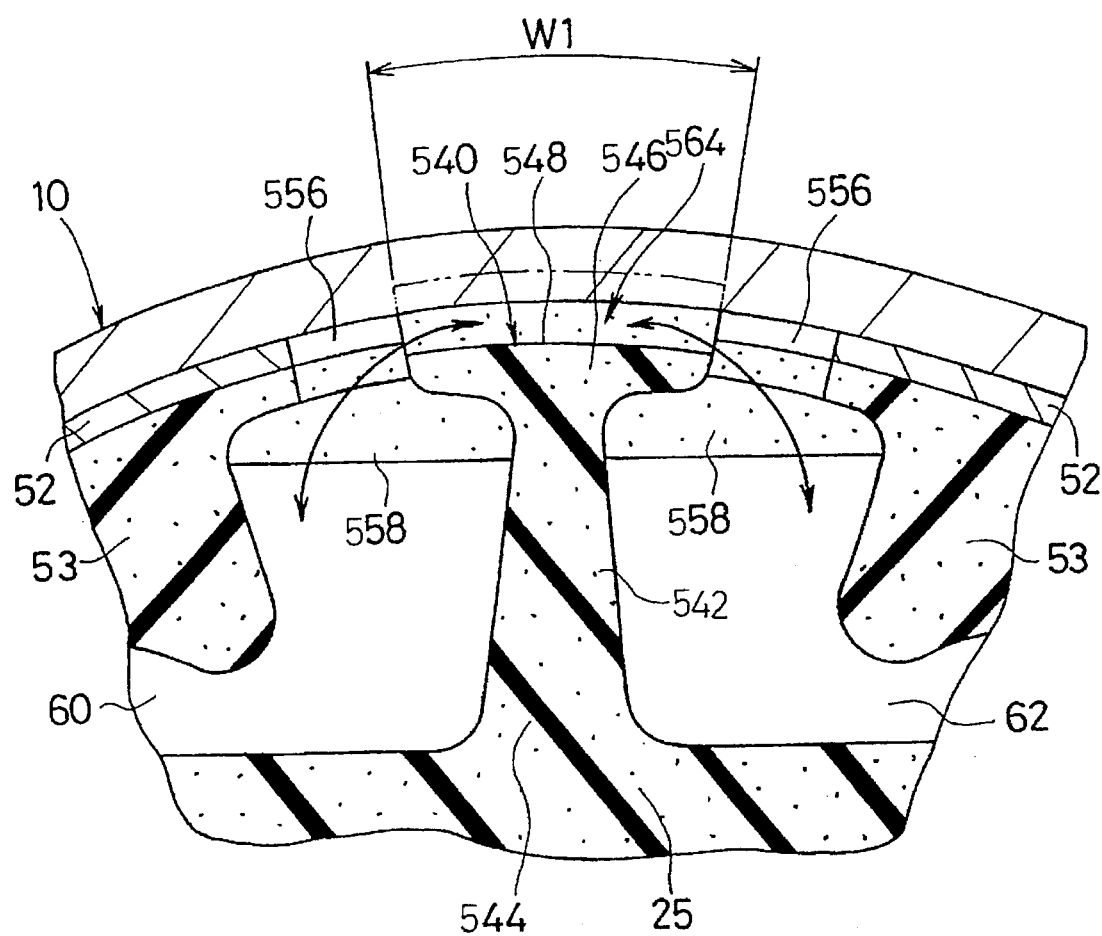
FIG. 15 is an enlarged sectional view showing an elastic wall of the fifth embodiment.
Figure 16:
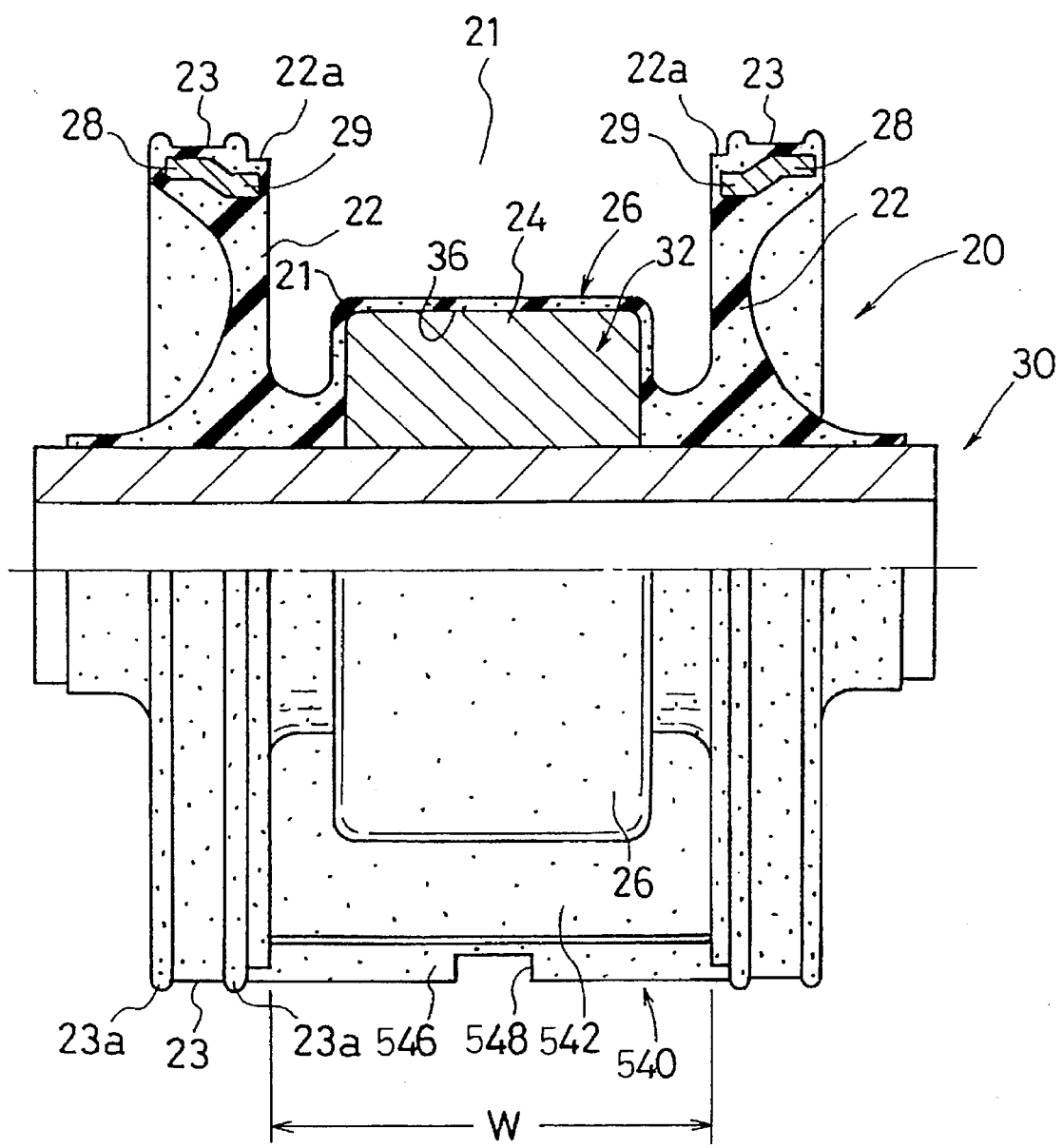
FIG. 16 is an axial semi-sectional view showing an inner cylinder and an elastic block according to the fifth embodiment.

As indicated in a broken line in FIG. 15 showing an enlarged portion of the elastic wall 540 of FIG. 13, it is so designed that a position of the outer edges 546 before engaging to the outer cylinder 10 is outside the inside diameter of the outer cylinder 10, and when pressed into the elastic block 20, compressed inward in a radial direction to contact closely to the inner surface of the outer cylinder 10, and to separate the fluid-chamber 21 into two fluid chambers 60 and 62.

Figure 17:
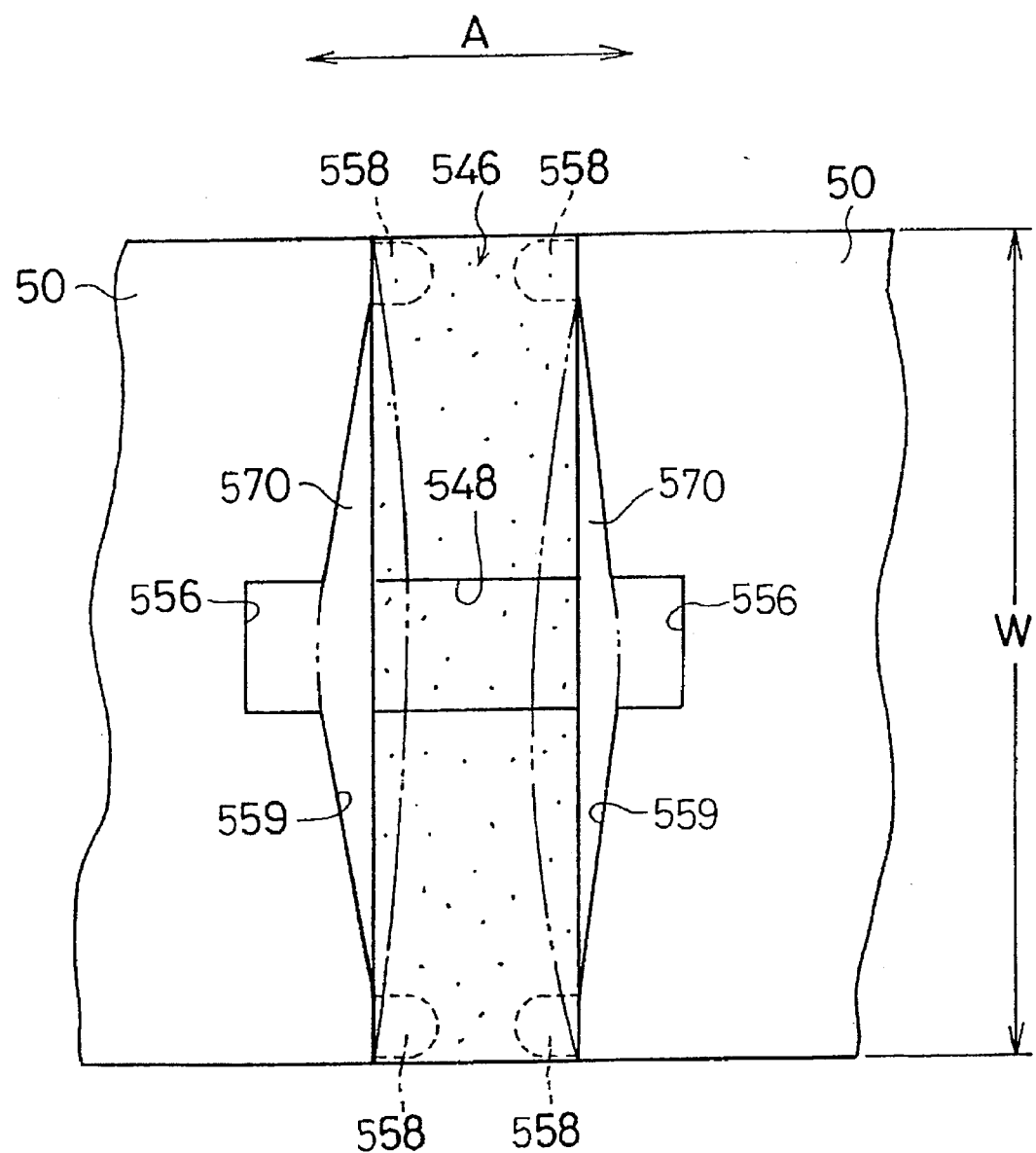
FIG. 17 is a plan view showing outer edges of the fifth embodiment.

FIG. 17 is an expanded view showing a state where the outer edge 546 of the elastic wall 540 is clamped between respective end portions of a pair of fluid-chamber covers 50, as illustrated in FIG. 17 and FIG. 15, at circumferential edges 559 of the fluid-chamber covers 50, notches 556 are formed at extended positions of the orifice groove 548 to constitute an orifice passage 564 with the orifice groove 548 and the inner surface of the outer cylinder 10.

The circumferential edges 559 of the fluid-chamber covers 50 clamping the outer edges 546 are formed diagonally, from the lateral opposite ends toward the center, to lateral edge lines of the outer edges 546 such that its approximate center portion in a lateral direction (vertical direction in the figure) is spaced extremely from the outer edges 546. As a result, on opposite sides of the outer edged 546, an approximately triangular clearance 570 is formed between the circumferential edges 559, thereby the outer edges 546 can be deformed in direction orthogonal to an axis (a direction of arrow A).

The notches 556 are formed at the approximate center portion in the lateral direction of the circumferential edges 559 by cutting in from the edges so as to space from the outer edges 546, and it is so designed that the orifice passage 546 is not clogged even when the outer edges 546 contacts to the circumferential edges 559.

As shown in FIG. 15 and FIG. 17, at opposite end portions in the lateral direction of the circumferential edges 559, positioning protrusions 558 protrude in the circumferential direction to position the outer edges 546, by contacting to and supporting the rear side of the outer edges 546 of the elastic wall 540.

Next, the operation of the fifth embodiment is described. Since the elastic wall 540 deforms elastically responsive to an magnitude of input vibration, and the outer edge 546 is allowed to move in the direction orthogonal to the axis (the direction of arrow A) between a pair of circumferential edges 559 facing each other as shown in FIG. 17, by reducing a spring constant of the elastic wall 540 within a movable range of the outer edges 546, and largely changing the spring constant to become higher at the time point of contacting to the circumferential edges 559, a non-linear spring characteristic can be obtained.

Thus, the elastic wall 540 can absolve an internal pressure surge, and a resonance point in the orifice passage 564 can be changed so as to bring the attenuation into a necessary range.

In addition, as the elastic wall 540 is formed as a unit with the elastic block 20, though the concentration of stress tends to occur at the base portion 544, which is a connection with the elastic layer 524, and at the connection with the ring portion 22 following elastic deformation, since the outer edge 546 is allowed to move between the pair of circumferential edges 559 facing each other as stated above, the concentration of stress exerted by the movement thereof is relieved and durability of the elastic wall 540 can be improved.

And hence, in FIG. 13, FIG. 15 and FIG. 17, at very small vibrations of a high frequency such as the vibration of engines and of a low frequency such as the shaking vibration, elastic deformation of the wall body portion 542 of the elastic wall 540 mainly absolves various variations of the fluid chambers 60 and 62, thus low-action spring characteristics superior to the past can be realized.

Also, when a comparatively large vibration having a low frequency is applied, since fluid following the volumetric changes of the fluid chambers 60 and 62 passes through the orifice passage 564, a high attenuation condition is obtained by the attenuation force produced at that time to absolve the vibration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fluid-filled insulating bushing comprising:
   an inner cylinder,
   an outer cylinder, and
   an elastic block interposed between said inner and outer cylinders,
   a fluid-chamber space formed in said elastic block,
   an elastic wall for partitioning said fluid-chamber space into at least two fluid chambers communicating with each other through an orifice passage, and
   said elastic wall being formed separately from and being disengageable relative to said elastic block.

2. The fluid-filled insulating bushing in accordance with claim 1, wherein the elastic wall includes a wall body portion extending in a radial and axial direction between the inner and outer cylinders, and outer edges of a periphery of said wall body portion are in intimate contact with an inner surface of said outer cylinder, and other portions including inner edges on the inner cylinder side are in intimate contact with said elastic block to seal filled-in fluid by these intimately contacting portions.

3. The fluid-filled insulating bushing in accordance with claim 2, wherein inner edges are engaged to an elastic wall mount formed as a unit with the elastic block.

4. The fluid-filled insulating bushing in accordance with claim 3, wherein a clearance is formed between the elastic wall mount and a wall body portion of the elastic wall.

5. The fluid-filled insulating bushing in accordance with claim 3, wherein, at least, a pair of lips are provided in a clearance formed between the elastic wall mount and a wall body portion of the elastic wall to clamp said wall body portion of said elastic wall therebetween.

6. The fluid-filled insulating bushing in accordance with one of claim 1 through claim 3, wherein fluid chambers of the elastic block are open respectively on the outer cylinder side, and open portions are covered by partly circular fluid-chamber covers which are provided in plural numbers corresponding to said fluid chambers along an inner surface of said outer cylinder.

7. The fluid-filled insulating bushing in accordance with claim 6, wherein outer edges of the elastic wall are clamped between respective end portions of the two fluid-chamber covers adjacent to each other in a circumferential direction.

8. The fluid-filled insulating bushing in accordance with claim 7, wherein positioning means are provided at connections between outer edges of the elastic wall and the fluid-chamber cover.

9. The fluid-filled insulating bushing in accordance with claim 7, wherein the orifice passage is formed by a groove on an outer edge surface of the elastic wall, a communicating portion formed at edges of fluid-chamber covers clamping said elastic wall so as to communicate said groove and fluid chambers and an inner surface of an outer cylinder.

10. The fluid-filled insulating bushing in accordance with one of claim 1 through claim 3, wherein a seal lip is provided, at least, at a portion of a periphery of the elastic wall contacting to the elastic block.

11. The fluid-filled insulating bushing in accordance with one of claim 1 through claim 3, wherein the elastic block includes ring portions engaging into the outer cylinder at axial opposite end portions along said inner cylinder, and rigid ring frames are embedded in a unit at circumferential outer edges of said ring portions.

12. The fluid-filled insulating bushing in accordance with claim 11, wherein the ring frame is disposed on a peripheral surface of the ring portion, and annular seal rings are provided as a unit with the elastic block on axial opposite sides of said ring frame.

13. A fluid-filled insulating bushing comprising:
   an inner cylinder,
   an outer cylinder,
   an elastic block interposed between said inner and outer cylinders,
   a pair of ring portions formed at axial opposite sides of said inner cylinder and pressed into said outer cylinder,
   a fluid chamber space formed between said ring portions being provided in said elastic block, and
   an elastic wall formed as a unit with said elastic block for partitioning said fluid chamber space into at least two fluid chambers communicating with each other through a communication passage,
   wherein said elastic wall includes a wall body portion extending in a radial and axial direction between said inner and outer cylinders, and outer edges located on said outer cylinder side are movable by said outer cylinder; and
   the fluid chambers of the elastic block are open at respective outer cylinder sides, and open portions are covered by partly circular fluid-chamber covers which are provided in plural numbers corresponding to said fluid chambers along an inner surface of said outer cylinder, and outer edges of the elastic wall are clamped between circumferential end portions of said pair of fluid-chamber covers.

14. A fluid-filled insulating bushing comprising:
   an inner cylinder,
   an outer cylinder,
   an elastic block interposed between said inner and outer cylinders,
   a pair of ring portions formed at axial opposite sides of said inner cylinder and pressed into said outer cylinder,
   a fluid chamber space formed between said ring portions being provided in said elastic block, and
   an elastic wall formed as a unit with said elastic block for partitioning said fluid chamber space into at least two fluid chambers communicating with each other through a communication passage,
   wherein said elastic wall includes a wall body portion extending in a radial and axial direction between said inner and outer cylinders, and outer edges located on said outer cylinder side are movable by said outer cylinder, wherein said outer edges are in intimate contact with an inner surface of the outer cylinder by engagement, and protrude radially outwardly from the inner surface of said outer cylinder before engagement to said outer cylinder; and
   the fluid chambers of the elastic block are open at respective outer cylinder sides, and open portions are covered by partly circular fluid-chamber covers which are provided in plural numbers corresponding to said fluid chambers along an inner surface of said outer cylinder, and outer edges of the elastic wall are clamped between circumferential end portions of said pair of fluid-chamber covers.

15. The fluid-filled insulating bushing in accordance with claim 13 or claim 14, wherein between the outer edges of the elastic wall and the circumferential end portions of a fluid-chamber cover, a clearance is formed to allow elastic deformation of said outer edges.

16. The fluid-filled insulating bushing in accordance with claim 15, wherein circumferential end portions of the fluid-chamber cover are formed diagonally to an end portion of outer edges extending axially, and an axial widthwise center portion is extremely spaced from said outer edges.

17. The fluid-filled insulating bushing in accordance with claim 16, wherein the communication passage of fluid which communicates fluid chambers clamping the elastic wall is formed by, an orifice groove formed on an outer surface of outer edges, a notch formed at the circumferential end portion of the fluid-chamber cover and an inner surface of the outer cylinder.

18. The fluid-filled insulating bushing in accordance with claim 17, wherein the notch is formed at an axial widthwise center portion of a portion extremely spaced from outer edges in the circumferential end portion of the fluid-chamber cover.

* * * * *